United States Patent
Ha (10) Patent No.: US 6,372,987 B1
(45) Date of Patent: Apr. 16, 2002

(54) SAFETY GUARD DEVICE FOR ELECTRICAL WALL OUTLET

(76) Inventor: Heung Yong Ha, 8919 Mountain Ash Dr., Springfield, VA (US) 22153

( * ) Notice: Subject to any disclaimer, the term of this patent is extended or adjusted under 35 U.S.C. 154(b) by 0 days.

(21) Appl. No.: 09/661,290

(22) Filed: Sep. 13, 2000

Related U.S. Application Data (63) Continuation-in-part of application No. 09/494,430, filed on Jan. 31, 2000.

(51) Int. Cl.⁷ ................................................. H02G 3/14
(52) U.S. Cl. ............................ 174/67; 174/66; 220/241
(58) Field of Search ..................... 174/66, 67; 220/241, 220/242, 3.8

(56) References Cited

U.S. PATENT DOCUMENTS

| | | |
|---|---|---|
| 3,068,442 A | 12/1962 | Kubik et al. |
| 4,605,270 A | 8/1986 | Aslizadeh |
| 4,607,136 A | 8/1986 | Thomas |
| 4,711,634 A | 12/1987 | Antone, II et al. |
| 4,731,511 A | 3/1988 | Steinhilber et al. |
| 4,733,017 A * | 3/1988 | Wolfe-Taylor et al. ........ 174/67 |
| 4,737,599 A * | 4/1988 | Fontaine ........................ 174/67 |
| 4,793,818 A * | 12/1988 | Poirier ......................... 439/140 |
| 4,857,004 A | 8/1989 | Poirier |
| 4,952,755 A | 8/1990 | Engel et al. |
| 5,165,042 A * | 11/1992 | Klinger ........................ 174/67 |
| 5,212,347 A | 5/1993 | Powers et al. |

* cited by examiner

*Primary Examiner*—Dean A. Reichard
*Assistant Examiner*—Angel R. Estrada
(74) *Attorney, Agent, or Firm*—Birch, Stewart, Kolasch & Birch, LLP (57) ABSTRACT

A safety guard device for an electrical wall outlet which includes a base plate adapted to be fixed to an electrical receptacle, said base plate containing at least one aperture therein which is in registry with the electrical receptacle, a cover plate in slidable engagement with the base plate for covering the base plate, said cover plate containing an aperture which is positioned to provide selective registry with the aperture in the base plate and thus access to the electrical receptacle, and locking means operatively associated with the base plate and cover plate for locking the plates relative to each other when the electrical receptacle is covered by the cover plate.

11 Claims, 7 Drawing Sheets

SAFETY GUARD DEVICE FOR ELECTRICAL WALL OUTLET

The present invention is a continuation-in-part of application Ser. No. 09/494,430 filed Jan. 31, 2000.

BACKGROUND OF THE INVENTION

1. Field of the Invention

The present invention relates to a safety guard device for an electrical wall outlet and more particularly to an improved safety plate device containing a manually slidable panel which is provided with an opening which provides access to an electrical wall outlet, but which also can prevent access to such an outlet when the outlet is not otherwise occupied by an electrical plug. Advantageously, the safety guard device is provided with a locking system for locking the manually slidable panel to prevent access to the electrical outlet.

2. Description of Related Art

Generally, since the introduction of electrical power in homes, there has always been a problem of safety, especially where children are present. Various types of safety cover plates for electrical wall outlets are known in the art.

For example, U.S. Pat. No. 3,068,442 issued to Kubik et al. employs a set of covers that shield the socket openings. Through a single control, all of the socket openings may be exposed simultaneously for use. When a plug is removed, the cover, which is spring-biased, closes. The cover slide is manually actuated with a vertically positioned control that unlatches the covers.

U.S. Pat. No. 4,605,270 issued to Aslizadeh describes a protective cover for an electrical outlet that comprises a pair of slidable closure plates and a pair of coil spring-actuated blocking plates, wherein both plates are positioned within the boundaries of the rectangular openings in the front wall of the cover.

U.S. Pat. No. 4,607,136 issued to Thomas teaches a child-proof protective device with a plate which covers and registers with a plug. The plate includes a pair of slidable doors or panels which are releasably locked in position with a pair of sliding, locking members, one positioned on the top and one positioned on the bottom, thereby precluding operation by children with small hands.

U.S. Pat. No. 4,711,634 issued to Antone II et al. employs a face plate with independent closures, each of the closures being biased to a closed position by tensioning members, such as rubber bands or helical springs. The receptacle is covered by guides positioned within the cover plate using a mortise and tenon joint.

Steinhilber et al. discloses in U.S. Pat. No. 4,731,511 a decorative wall plate and slider cap. A slider member having two barbed clips interact with protruding rail members for containment and fingers act as cams to move a toggle in the vertical direction. A decorative cap gives form to the toggle switch.

U.S. Pat. No. 4,733,017 issued to Wolf-Taylor et al. employs a pair of spring-loaded sliding, traverse plates which shift to open and closed positions in front of an electrical wall outlet receptacle. The plates are in tracks and automatically spring to enclose the plug when released.

U.S. Pat. Nos. 4,793,818 and 4,857,004 issued to Poirier disclose a safety guard which comprises a cover with a pair of openings adapted to be mounted over an electrical wall outlet and closure elements which are slidably mounted to the cover to expose or to cover the openings in registry with the sockets of the wall outlet.

Although these protective systems provide for spring-actuated blocking plates which are movable to automatically cover the socket openings if a plug is removed from a socket, they are not fully protective in that most children will be able to master the sliding movement of the plates, either accidentally or through observation.

U.S. Pat. No. 4,952,755 issued to Engel et al. discloses a safety plate for electrical outlets which includes a cover plate having apertures therein for receiving the prongs of an electrical plug. A pair of slidable panels also having apertures for the prongs of a plug are mounted to the back of the cover plate and are held in place by a back plate.

U.S. Pat. No. 5,212,347 issued to Power et al. discloses an electrical apparatus cover plate which has an enclosing base plate mounted on a wall over an electrical outlet and a protective shield that is retained through a dovetail arrangement provided in the base plate and covers the outlet for protection. However, the operation of both of these electrical devices can be difficult in operation.

The present inventor is also prosecuting another U.S. application Ser. No. 09/494,430, filed Jan. 31, 2000, which discloses a safety guard device for an electrical outlet which also includes locking members for locking or unlocking a base plate to a cover plate. The base plate can be slidably interlocked through the pair of guides, and the bottom opening of the cover plate can be used with a lower opening or an upper opening of the base plate for preventing access to the wall outlet when an electrical plug is not inserted. However, this safety guard device for an electrical outlet includes locking members and guides located at the top portion thereof, respectively.

SUMMARY OF THE INVENTION

Accordingly, it is an object of the present invention to provide a safety guard device for an electrical wall outlet which eliminates the above problems encountered with conventional safety cover plates for an electrical wall outlet.

Another object of the present invention is to provide a safety plate device which includes a manually slidable panel having an opening for protecting an electrical wall outlet designed to prevent access to such outlet when an electrical plug is not inserted.

A further object of the present invention is to provide a safety guard device for an electrical wall outlet which includes a base plate having upper and lower openings and a pair of locking members extending from the bottom thereof and a cover plate having a bottom opening and a pair of apertures disposed at the bottom thereof for slidably interlocking with the locking members of the base plate.

Still another object of the present invention is to provide a safety guard device for an electrical wall outlet which includes a base plate having upper and lower openings and a pair of locking members provided on opposite sides, e.g., on the upper left side and on the lower right side thereof, and a cover plate having a bottom opening and a pair of engaging and releasing members for slidably interlocking with the locking member of the base plate.

Yet another object of the present invention is to provide a safety guard device for an electrical wall outlet which is simple in structure, inexpensive to manufacture, durable in use and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a safety guard device for an electrical outlet which includes a base plate having a pair of openings and a pair of locking members extended from the bottom thereof and a cover plate having a bottom opening and a pair of slots located at the bottom thereof, whereby the locking members of the base plate can be locked to the cover plate or unlocked from the cover plate.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
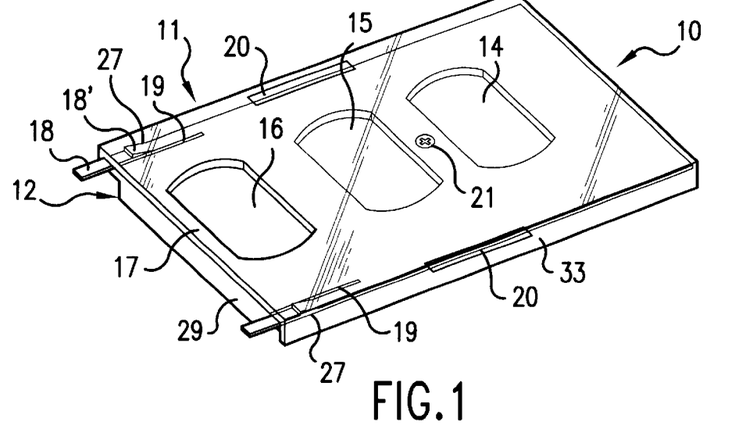
FIG. 1 is a perspective view of the safety guard device for an electrical wall outlet according to the present invention.
Figure 2:
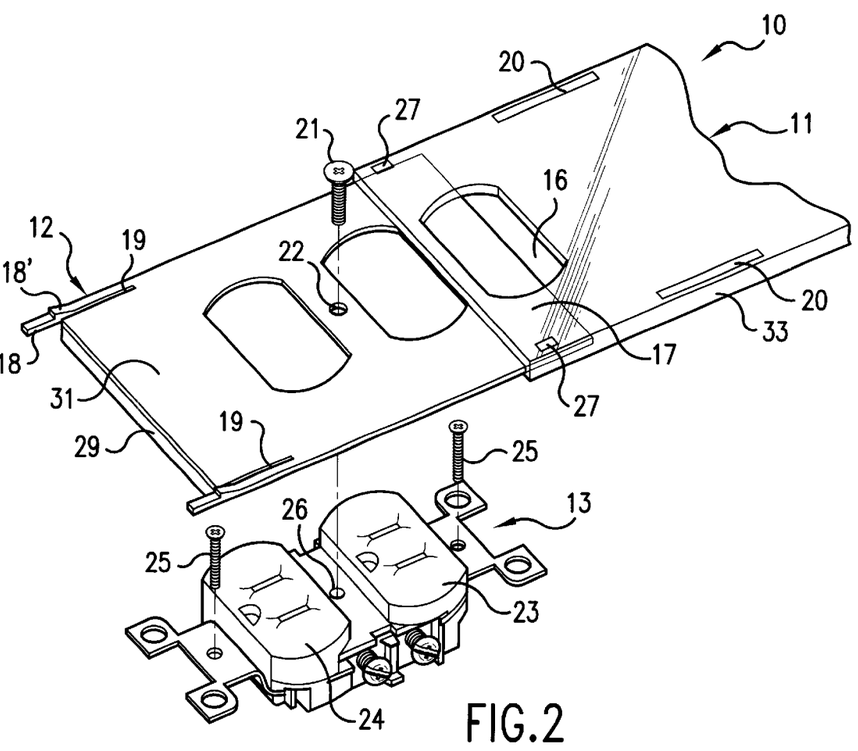
FIG. 2 is an exploded, perspective view of the safety guard device of the present invention and a conventional electrical wall outlet to be secured to a wire box.
Figure 3:
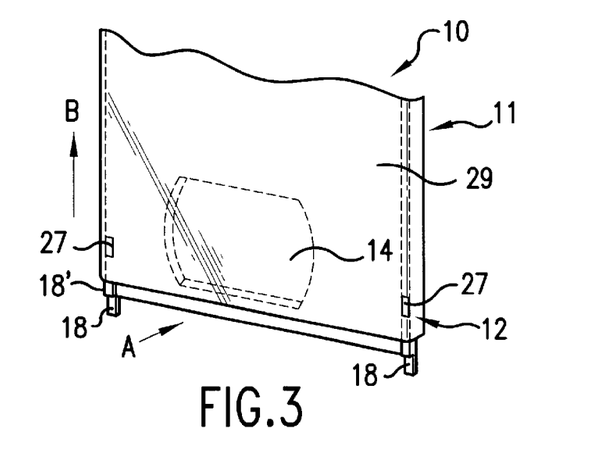
FIG. 3 is a perspective view showing a pair of locking members on the base plate and a pair of engaging members on the cover plate of the safety guard device according to the present invention, showing the locking or unlocking positions thereof.

Referring now in detail to the drawings for the purpose of illustrating preferred embodiments of the present invention, the safety guard device for an electrical wall outlet as shown in FIGS. 1, 2 and 3 comprises a cover plate 11 having a bottom opening 16, the cover plate being slidably mounted to a base plate 12 having an upper opening 14 and a lower opening 15. These upper, lower and bottom openings 14, 15 and 16 are substantially similar openings and are the same size as the upper and lower receptacles 23 and 24 of a double-outlet electrical receptacle 13. The cover plate 11 has a C-shaped frame 33 for slidably engaging the base plate 12. Also, the base plate 12 is a rectangular frame 29. Both cover plate and base plate 11 and 12 can be made of a transparent or opaque material such as a plastic or like material.

Figures 6, 6A:
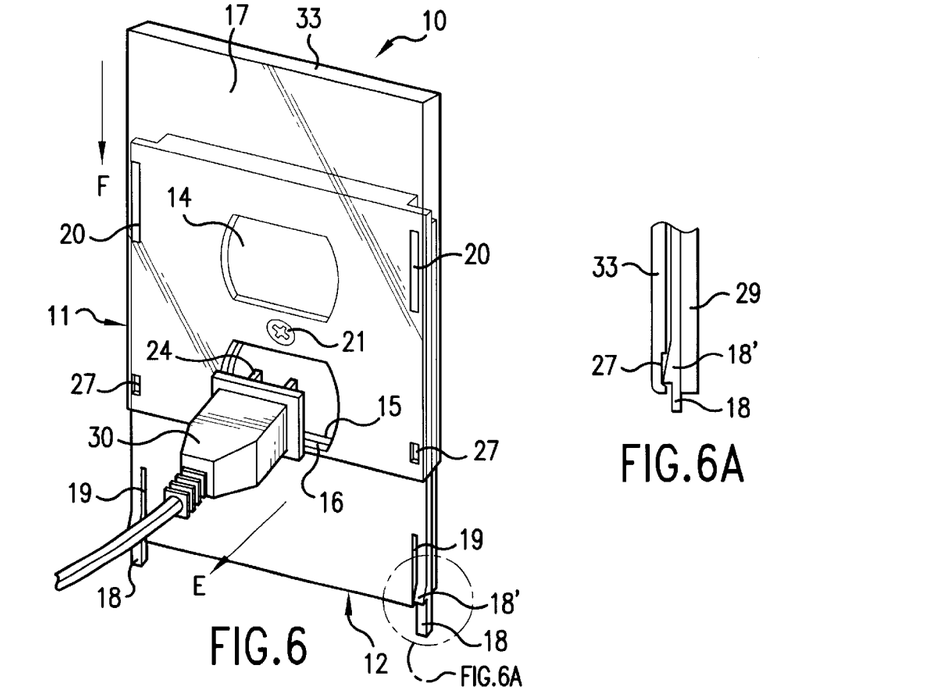
FIG. 6 is a perspective view of the safety guard device according to the present invention showing the cover plate automatically separated from the base plate due to gravity.
Figure 7:
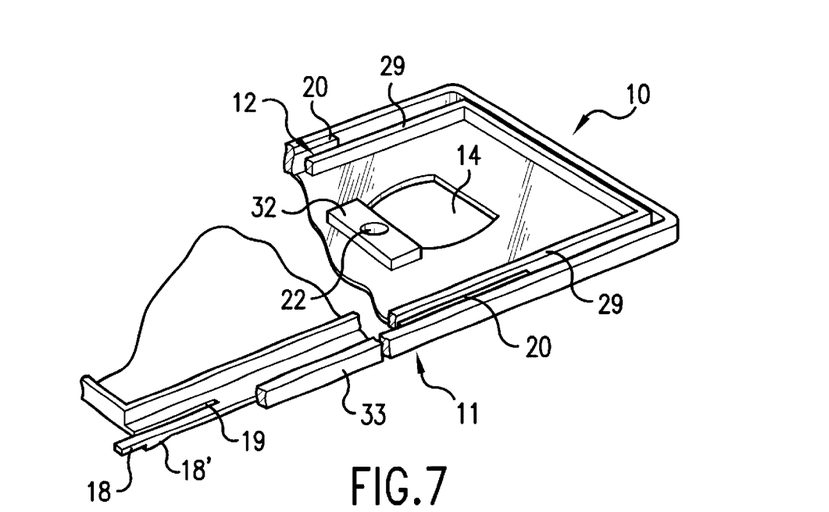
FIG. 7 is a bottom perspective view of the safety guard device of the present invention showing the base plate assembled with the cover plate and an enlarged guide member attached to the cover plate.

As shown in FIGS. 3, 6 and 7, the cover plate 11 includes a cover plate front wall 17 having the bottom opening 16 disposed on the bottom and lowest area thereof, a C-shaped frame 33, a pair of engaging grooves 27 disposed on the bottom corner of both sides of the frame 33, and a pair of guiding strips or protrusions 20 extending from the middle portion of both sides of the frame 33.

Referring to FIGS. 2, 3 and 7, the base plate 12 includes a base plate front wall 31 having the upper and lower openings 14 and 15 disposed in the central area thereof for corresponding registry with the upper and lower receptacles 23 and 24 of the electrical receptacle 13 which is, in turn, secured to the wire box (not shown) through screws 25. A first aperture 22 is disposed between both upper and lower openings 14 and 15 for securing the base plate 12 to the double-outlet electrical receptacle 13 through a bolt 21 and a second aperture 26 is provided in the double-outlet electrical receptacle 13. The rectangular frame 29 slidably moves under the guiding strips or protrusions 20 of the cover plate 11. The first aperture 22 is provided with a supporting plate 32 for supporting to the first aperture 22 (FIG. 7).

The base plate 12 is provided with a pair of lateral slits 19 which contain a pair of locking and unlocking handles 18 for extending into and engaging a pair of lateral grooves 27 provided in the cover plate 11. Therefore, each locking or unlocking handle 18 has a locking projection 18' for flexibly locking with the engaging groove 27 or smoothly disengaging from the engaging groove 27 (FIG. 6) by pushing the locking or unlocking handles 18 simultaneously with a thumb and index finger in the direction indicated by arrow (A) from a locking position to the unlocked position shown in FIG. 3. The grooves 27 are larger than the locking projection 18' of the locking or unlocking handles 18, respectively, for freely moving into and out of the grooves 27. It should be understood that other types of locking mechanisms can be used and can be selectively provided on either the base plate 12 or the cover plate 11. However, the location of the locking mechanisms at the bottom of the device and the required use of both locking mechanisms, simultaneously provides more security for unwanted access to the electrical outlet.

Figure 4:
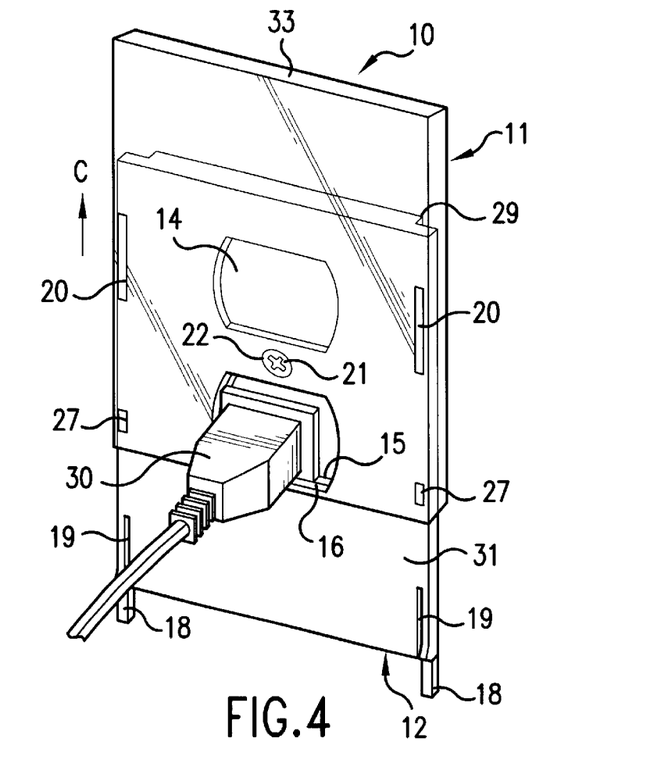
FIG. 4 is a perspective view of the safety guard device according to the present invention showing the use of one plug which is inserted into the electrical outlet through the present device in an unlocking position.

As shown in FIG. 3, the cover plate 11 can move up slidably in the direction indicated by arrow (B). Therefore, when the bottom opening 16 of the cover plate 11 matches with the lower opening 15 of the base plate 12, the plug 30 can be inserted into the lower receptacle 24 (FIG. 4). If two plugs are needed, the cover plate 11 is merely moved up further until the bottom opening 16 matches with the upper opening 14. Thereafter, the pair of plugs 30 can be inserted into the upper and lower receptacles 23 and 24 (FIG. 5).

After that, when the plugs 30 are taken out, the cover plate 11 can slide down automatically due to gravity (FIG. 6) and finally the cover plate 11 can be locked to the base plate 12 (FIG. 1).

Figure 5:
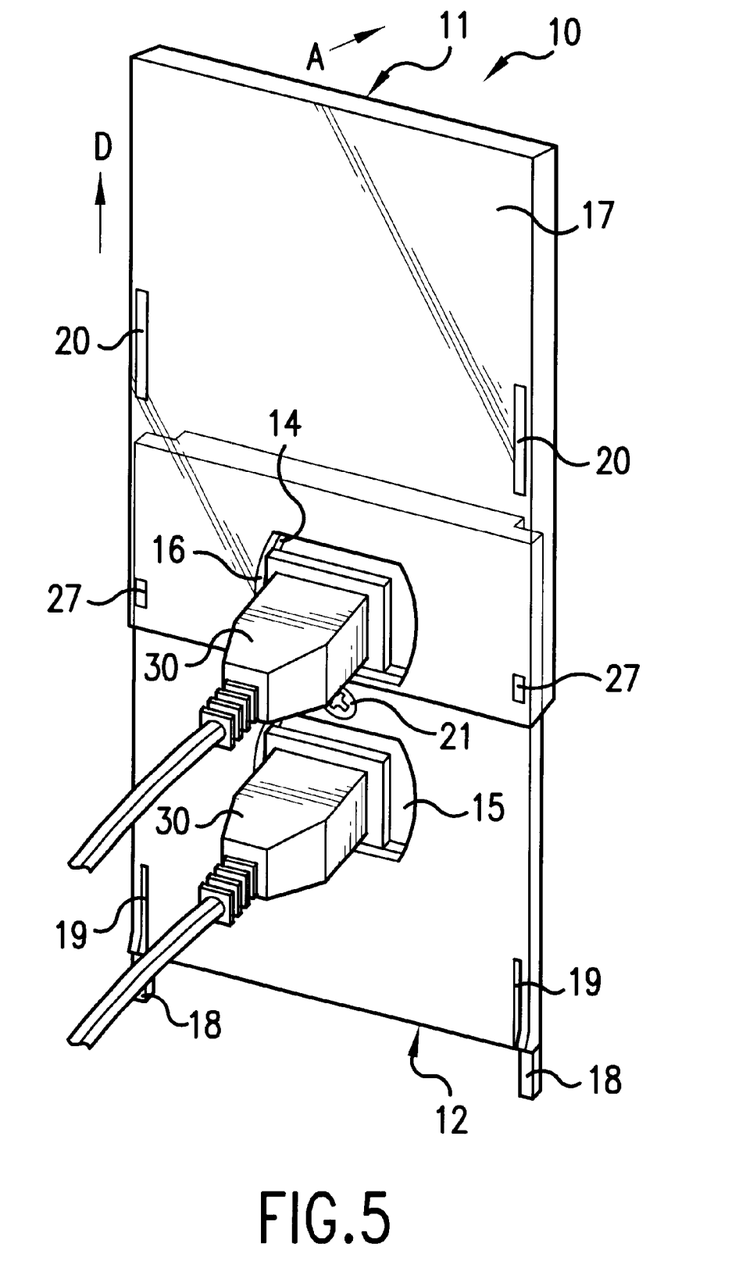
FIG. 5 is a perspective view of the safety guard device according to the present invention showing the insertion of two plugs into the outlets through the present device in an unlocking position.

Referring to FIGS. 4, 5 and 6, the safety guard device 10 for an electrical wall outlet according to the present invention operates as follows. As shown in FIG. 1, the safety guard device 10 maintains a locking stage in an original position. In order to use the electrical outlet, the handles 18 with the projections 18' are disengaged from the grooves 27 (FIG. 6) of the cover plate 11, and the cover plate 11 is pushed in the direction indicated by the arrow (B) as shown in FIG. 3.

In the direction indicated by arrow (C) shown in FIG. 4, the upward movement of the cover plate 11 causes the bottom opening 16 thereof to match with the lower opening 15 of the base plate 12. Accordingly, a plug 30 can be inserted into the lower receptacle 24 of the double-outlet electrical receptacle 13 as shown in FIG. 4. At this time, the upper receptacle 23 of the double-outlet electrical receptacle is safely masked and protected by the cover plate front wall 17 of the cover plate 11, thereby protecting children from electrical shock.

As shown in FIG. 5, in order to utilize the double outlets 23 and 24, the further upward movement of the cover plate 11 in the direction indicated by arrow (D) shown in FIG. 5 causes the bottom 16 thereof to match with the upper opening 14 of the base plate 12. Accordingly, another plug 30 can be inserted into the upper receptacle 23 of the double-outlet electrical receptacle 13 (FIG. 5). Thus, the upper and lower outlets 23 and 24 of the double-outlet electrical receptacle 13 are safety masked and protected by the pair of plugs 30.

FIG. 6 shows a perspective view of the safety guard device 10 according to the present invention explaining how the cover plate 11 moves in a reverse direction when the plugs 30 are removed from the receptacles 23 and 24. For example, when the plug 30 is taken out from the receptacle 24 in the direction indicted by arrow (E), the cover plate 11 falls down naturally due to the weight of the cover plate 11 in the direction indicated by arrow (F) as shown in FIG. 6.

Accordingly, the cover plate 11 moves down until the pair of projections 18' of the handles 18 of the cover plate 11 lock with the pair of grooves 27 of the base plate 12 as shown in FIG. 1.

FIGS. 8, 9, 10, 11 and 12 show another embodiment of a safety guard device 100 according to the present invention which comprises a cover plate 110 having a bottom opening 16, the cover plate being slidably mounted to a base plate 120 having an upper opening 14 and a lower opening 15. These upper, lower and bottom openings 14, 15 and 16 are substantially similar openings and are the same size as the upper and lower receptacles 23 and 24 of a double-outlet electrical receptacle 13 (FIG. 2). The cover plate 110 has a C-shaped frame 330 for slidably engaging the base plate 120. Also, the base plate 120 is a rectangular frame 29. Both cover plate 110 and base plate 120 are made of transparent or opaque materials such as plastics, and the like.

Figure 8:
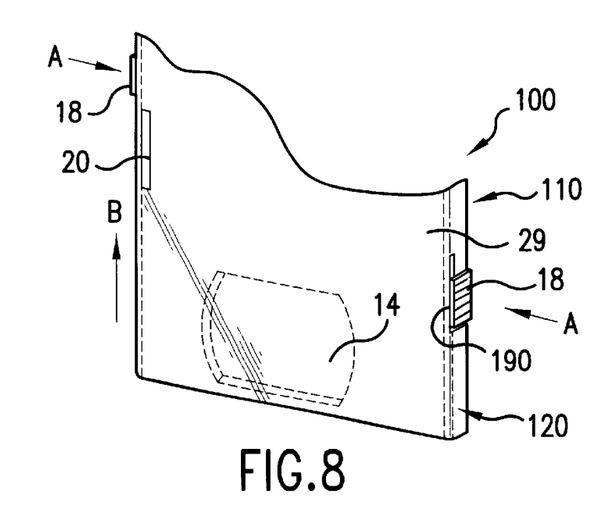
FIG. 8 is a perspective view showing a pair of locking members on a base plate and a pair of engaging members on a cover plate in another embodiment of the safety guard device of the present invention.
Figure 11:
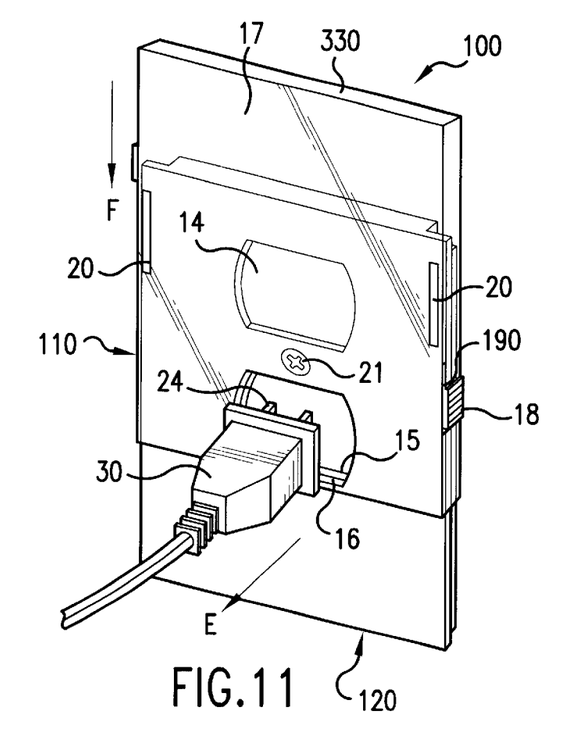
FIG. 11 is a perspective view of the safety guard device according to the present invention showing the base plate automatically separated from the cover plate due to gravity.
Figure 12:
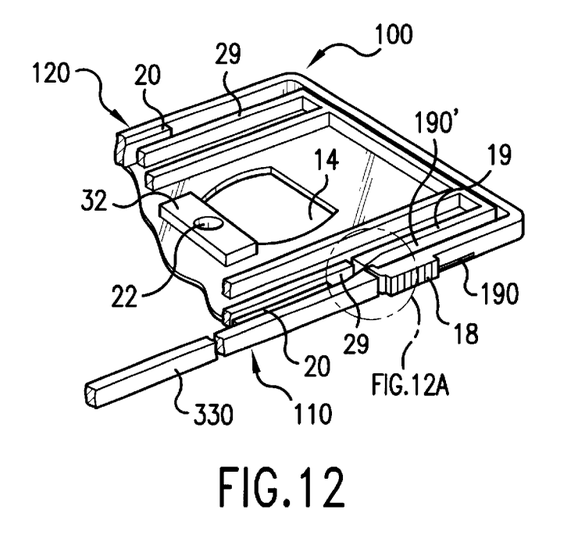
FIG. 12 is a bottom view of the safety guard device of the present invention showing the base plate assembled with the cover plate and an enlarged guide member attached to the cover plate.
Figure 12A:
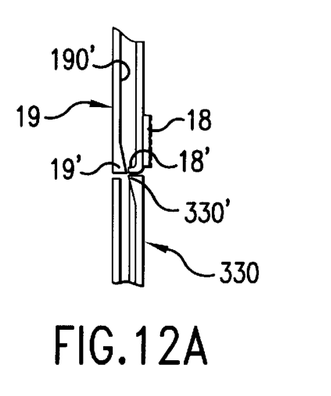

As shown in FIGS. 8, 11 and 12, the cover plate 110 includes a cover plate front wall 17 having the bottom opening 16 disposed on the bottom and lowest area thereof, a C-shaped frame 330, a pair of locking and unlocking handles 18 extending from the lower and upper portions of both sides of the frame 330, a pair of tapered guiding protrusions 330' extending from the lower and upper portions of both sides of the frame 330 and a pair of guiding protrusions 20 extending from the middle portion of both sides of the frame 330. Each handle 18 is made flexible by the use of handle slit 190. Also, each handle 18 has a locking protrusion 181 for locking the base plate 120 and has a rugged surface for improving the gripping function thereof.

Referring to FIGS. 2, 8 and 12, the base plate 120 includes a base plate front wall 31 having the upper and lower openings 14 and 15 disposed on the central area thereof for correspondingly registering with the upper and lower receptacles 23 and 24 of the electrical receptacle 13 which is, in turn, secured to the wire box (not shown) through screws 25. A first aperture 22 is disposed between both upper and lower openings 14 and 15 for securing the base plate 120 to the double-outlet electrical receptacle 13 through a bolt 21 and a second aperture 26 is provided in the double-outlet electrical receptacle 13. The rectangular frame 29 slidably moves under the guiding protrusions 20 of the cover plate 11. The first aperture 22 is provided with a supporting plate 32 for supporting to the first aperture 22 (FIG. 12).

The base plate 120 contains a pair of locking or unlocking levers 19 extending to engage a pair of locking and unlocking handles 18 provided in the cover plate 11. Each locking or unlocking lever 19 has a locking projection 19' for locking with the locking protrusion 18' or for unlocking from the locking protrusion 18' by pushing the locking or unlocking handles 18 simultaneously with a thumb and index finger in the direction indicated by arrow (A) from a locking position to the doted, unlocked position shown in FIG. 8. The locking protrusions 18' are the same size as the locking projection 19' of the locking or unlocking handles 18, respectively, for tightly locking and freely unlocking the cover plate and the base plate from each other. It should be understood that other types of locking mechanisms can be used and can be selectively provided on either the base plate 120 or the cover plate 110.

Figure 9:
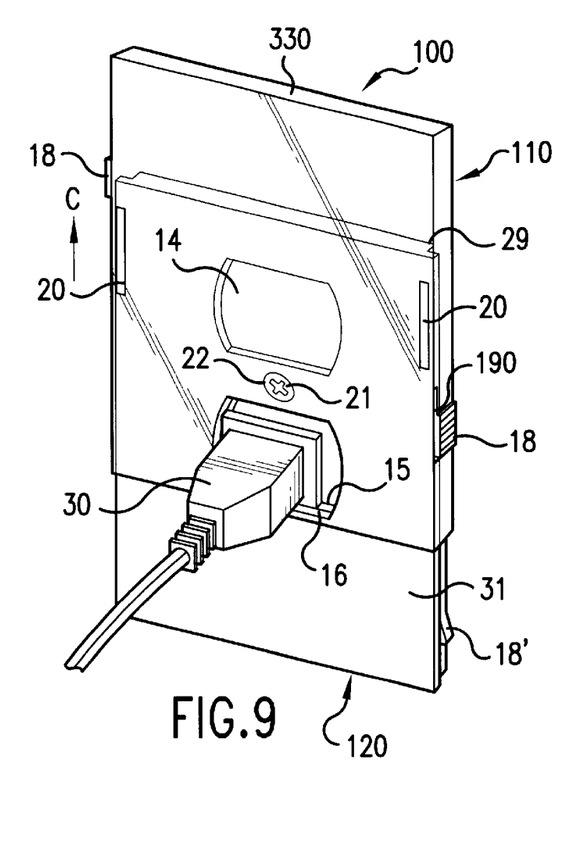
FIG. 9 is a perspective view of the safety guard device according to the present invention showing the use of one plug which is inserted into the electrical outlet through the present device, in an unlocking position.
Figure 10:
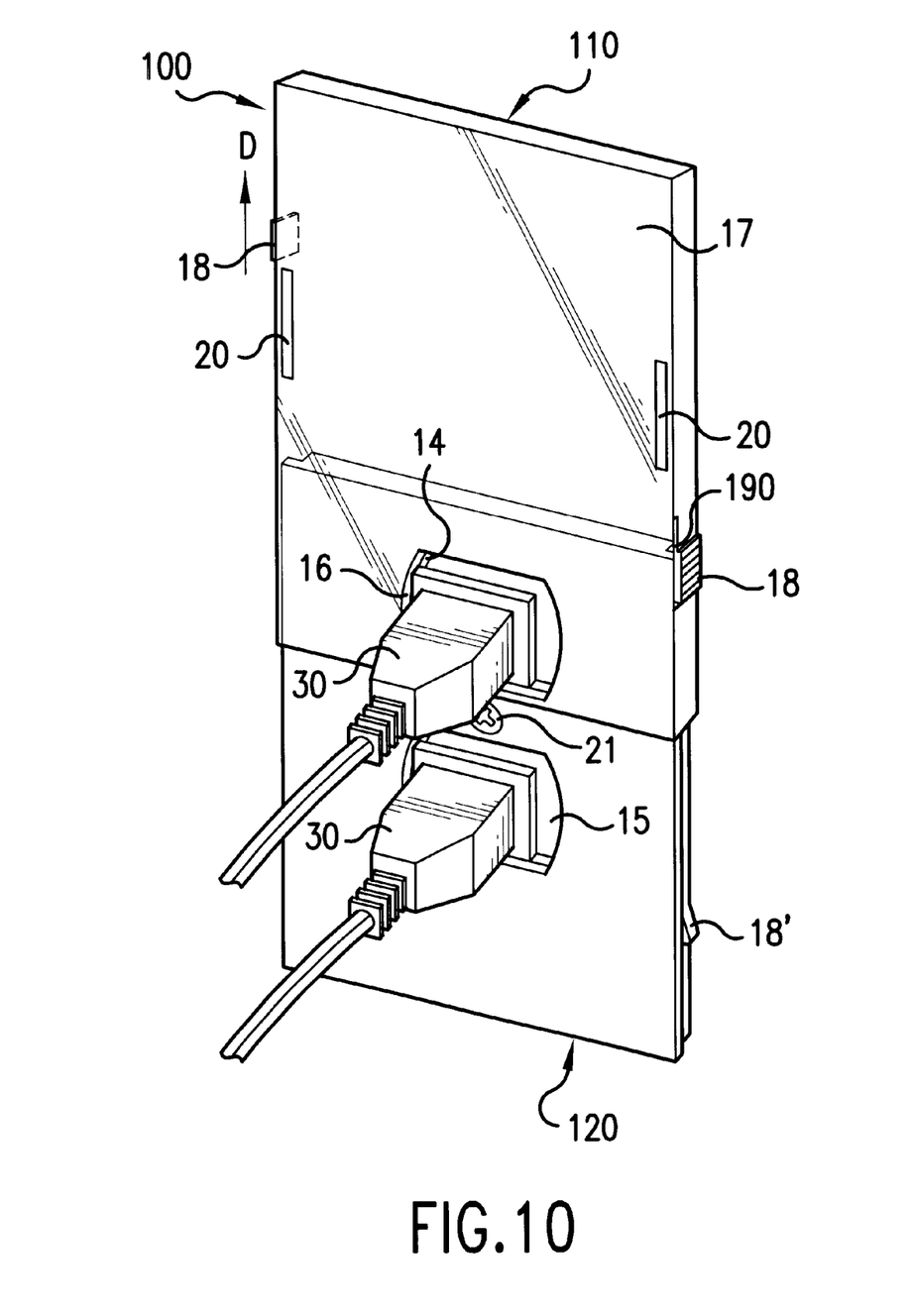
FIG. 10 is a perspective view of the safety guard device according to the present invention showing two plugs inserted into outlets through the present device, in an unlocking position.

As shown in FIG. 8, the cover plate 110 can move up slidably in the direction indicated by arrow (B). Therefore, when the bottom opening 16 of the cover plate 110 matches with the lower opening 15 of the base plate 120, the plug 30 can be inserted into the lower receptacle 24 (FIG. 9). If two plugs are needed, the cover plate 110 is merely moved up further until the bottom opening 16 matches with the upper opening 14. Thereafter, the pair of plugs 30 can insert into the upper and lower receptacles 23 and 24 (FIG. 10). After that, when the plugs 30 are taken out, the cover plate 110 can slide down automatically by gravity (FIG. 11) and finally the cover plate 11 can be locked to the base plate 12.

Referring to FIGS. 9, 10 and 11, the safety guard device 100 for an electrical wall outlet according to the present invention operates as follows. As shown in FIG. 8, the safety guard device 100 maintains a locking stage in an original position. In order to use the electrical outlet, the handles 18 with the projections 18' of the cover plate 110 are disengaged from the locking or unlocking projection 19' of the lever 19 of the base plate 120 when cover plate 110 is pushed in the direction indicated by the arrow (A) as shown in FIG. 8. The base plate 120 is slidably moved in the upward direction.

In the direction indicated by arrow (C) shown in FIG. 4, the upward movement of the base plate 120 causes the bottom opening 16 thereof to match with the lower opening 15 of the cover plate 110. Accordingly, a plug 30 can be inserted into the lower receptacle 24 of the double-outlet electrical receptacle 13 as shown in FIG. 9. At this time, the upper receptacle 23 of the double-outlet electrical receptacle 13 is safely masked and protected by the cover plate front wall 17 of the cover plate 110, thereby protecting children from electrical shock. The lever 19 is provided with a lateral slit 190' in the base plate 120 for improving the flexibility thereof as shown in FIG. 12.

As shown in FIG. 10, in order to utilize the double outlets 23 and 24, the further upward movement of the base plate 120 in the direction indicated by arrow (D) shown in FIG. 10 causes the bottom 16 thereof to match with the upper opening 14 of the cover plate 110. Accordingly, another plug 30 can be inserted into the upper receptacle 23 of the double-outlet electrical receptacle 13 (FIG. 10). Thus, the upper and lower outlets 23 and 24 of the double-outlet electrical receptacle 13 are safety masked and protected by the pair of plugs 30.

FIG. 11 shows a perspective view of the safety guard device 100 according to the present invention explaining how the cover plate 11 moves in a reverse direction when the plugs 30 are removed from the receptacles 23 and 24. For example, when the plug 30 is taken out from the receptacle 24 in the direction indicted by arrow (E), the cover plate 11 falls down naturally due to the weight of the cover plate 11 in the direction indicated by arrow (F) as shown in FIG. 11.

Accordingly, the cover plate 110 moves up until the pair of projections 18' of the handles 18 of the cover plate 11 lock with the locking projections 19' of the pair of levers 19 of the base plate 120 as shown in FIG. 8.

Accordingly, the safety guard devices 10 and 100 for an electrical wall outlet according to the present invention is simple in structure compared with conventional safety cover plates containing a spring. Also, the inventive device is compact for portability, inexpensive to manufacture, durable in use compared with a conventional plug-in device and refined in appearance.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A safety guard device for an electrical wall outlet which comprises:

a base plate adapted to be fixed to an electrical receptacle, said base plate containing at least one aperture therein which is in registry with the electrical receptacle, a cover plate in slidable engagement with the base plate for covering the base plate, said cover plate containing an aperture which is positioned to provide selective registry with the at least one aperture in the base plate and thus access to the electrical receptacle and said cover plate is of sufficient weight so that when the electrical receptacle is not in use the cover plate automatically slides over the receptacle preventing access thereto, and locking means operatively associated with a lower portion of the base plate and cover plate for locking the plates relative to each other when the electrical receptacle is covered by the cover plate.

2. The safety guard device of claim 1, wherein the aperture in the cover plate is disposed in the lower portion thereof.

3. The safety guard device of claim 1, wherein the base plate contains a plurality of apertures for accommodating a plurality of electrical receptacles.

4. The safety guard device of claim 1, wherein the locking means includes at least one groove provided in the bottom corner of the cover plate and at least one engaging means provided in the bottom corner of the base plate for engaging said groove when the cover plate is in a closed position.

5. The safety guard device of claim 1, wherein the cover plate is provided with lateral guides for guiding the cover plate in said sliding engagement with the base plate.

6. The safety guard device of claim 5, wherein the engaging means is a locking and unlocking handle which is separated from the base plate by a lateral slit for improving the flexibility thereof.

7. The safety guard device of claim 6, wherein the cover plate is provided with lateral grooves for receiving the engaging means of the base plate.

8. A safety guard device for an electrical wall outlet which comprises:

a base plate adapted to be fixed to an electrical receptacle, said base plate containing at least one aperture therein which is in registry with the electrical receptacle, a cover plate in slidable engagement with the base plate for covering the base plate, said cover plate containing an aperture which is positioned to provide selective registry with the at least one aperture in the base plate and thus access to the electrical receptacle and said cover plate is of sufficient weight so that when the electrical receptacle is not in use the cover plate automatically slides over the receptacle preventing access thereto, and locking means comprising at least one spring-biased locking and unlocking handle extending from the cover plate and at least one locking and unlocking lever extending from the base plate for engaging said handle when the cover plate is in a closed position.

9. The safety guard device of claim 8, wherein the locking means comprises two locking and unlocking handles, located on opposite sides of the cover plate and at different levels of the cover plate.

10. The safety guard device of claim 9, wherein the locking means comprises two locking and unlocking levers located on opposite sides of the base plate and in registry with the locking and unlocking handles when the cover plate is in a closed position.

11. The safety guard device of claim 10, wherein the lever is spring-biased for effecting accurate engagement with the locking and unlocking handles.

* * * * *